United States Patent [19]

Schmidhammer et al.

[11] Patent Number: 4,839,153
[45] Date of Patent: Jun. 13, 1989

[54] PROCESS FOR PURIFICATION OF HCL FROM PYROLYSIS OF EDC

[75] Inventors: Ludwig Schmidhammer, Haiming; Gerhard Dummer, Burgkirchen; Peter Hirschmann, Burghausen; Rudolf Strasser, Burghausen; Franz Haunberger, Burghausen, all of Fed. Rep. of Germany

[73] Assignee: Wacker-Chemie GmbH, Fed. Rep. of Germany

[21] Appl. No.: 151,817

[22] Filed: Feb. 3, 1988

Related U.S. Application Data

[63] Continuation-in-part of Ser. No. 813,624, Dec. 26, 1985, abandoned.

[30] Foreign Application Priority Data

Mar. 8, 1985 [DE] Fed. Rep. of Germany ....... 3508371

[51] Int. Cl.[4] .......................... B01D 53/36; C01B 7/07
[52] U.S. Cl. ................................... 423/488; 423/245.1
[58] Field of Search ........................... 423/245 S, 488

[56] References Cited

U.S. PATENT DOCUMENTS 3,260,059  7/1966  Rosenberg et al. ................. 423/488

OTHER PUBLICATIONS

Translation, German Patent Application 2,438,153 (2-19-1976).
Translation, German Patent Application 2,353,437 (5-15-1975).
Encyclopedia of Chemistry, 3rd ed, Hampel & Hawley, eds, Van Nostrand Reinhold Company, 1973, pp. 548-549.

Primary Examiner—John Doll
Assistant Examiner—Jeffrey Edwin Russel
Attorney, Agent, or Firm—Bierman and Muserlian

[57] ABSTRACT

In a process for the purification of hydrogen chloride from the pyrolysis of 1,2-dichloroethane, optionally after a preceding step of acetylene removal by selective hydrogenation under specific conditions followed by rectification of the resulting mixture to obtain hydrogen chloride containing at most 5 ppm of unsaturated hydrocarbons and at most 5 ppm of chlorinated hydrocarbons.

5 Claims, 1 Drawing Sheet

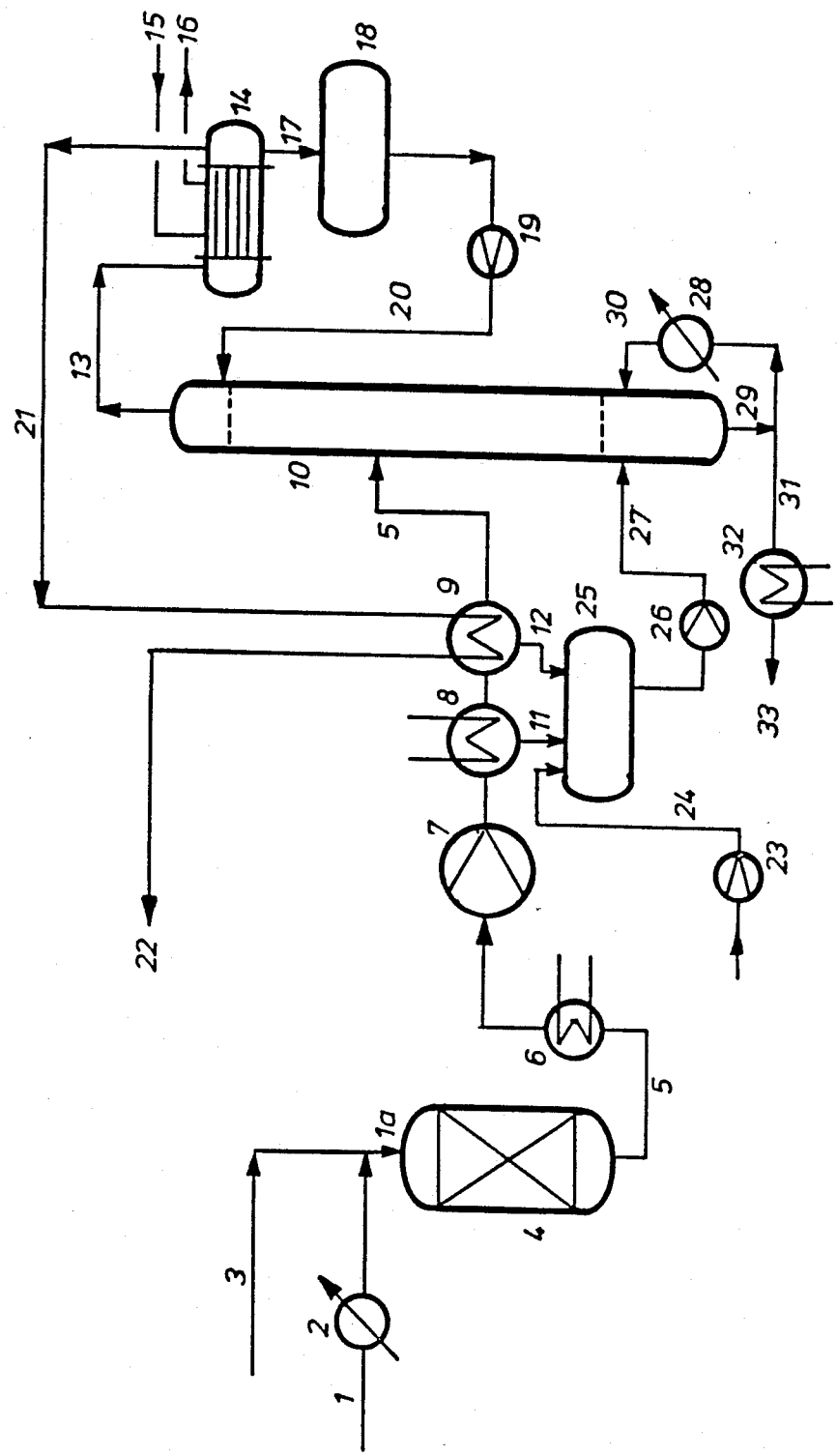

PROCESS FOR PURIFICATION OF HCL FROM PYROLYSIS OF EDC

PRIOR APPLICATION

This application is a continuation-in-part of copending application Ser. No. 813,624 filed Dec. 26, 1985, now abandoned.

STATE OF THE ART

It is well known that the commercial scale process for the preparation of vinyl chloride by pyrolysis of 1,2-dichloroethane yields large amounts of hydrogen chloride as by-product. This hydrogen chloride is contaminated with 0.05 to 0.5 mol % of acetylene and is normally used, after the removal of acetylene by selective hydrogenation to ethylene, for oxychlorination of ethylene to form additional 1,2-dichloroethane. The ethylene predominantly formed during the selective hydrogenation of acetylene is a desirable product of the oxychlorination and such hydrogenation processes have become known such as described in DE-OS No. 23 53 437, DE-AS No. 15 68 679 as well as DE-OS No. 30 43 442 (U.S. Pat. No. 4,388,278).

With the increasing expansion of the silicon chemistry, the demand for hydrogen chloride has increased for this branch of industry and although various sources of hydrogen chloride are known, hydrogen chloride from a 1,2-dichloroethane pyrolysis represents a particularly economical and always readily available starting material for the silicon chemistry. But a disadvantage of this hydrogen chloride is the presence of contaminants normally found in this process such as acetylene or its partial hydrogenation product ethylene, as well as hydrochlorination and decomposition products formed during the hydrogenolytic removal of acetylene to re-use the hydrogen chloride in the oxychlorination of ethylene. Besides ethylene these hydrochlorination and decomposition products remaining in the hydrogen chloride such as vinyl chloride, ethyl chloride and unsaturated $C_4$-hydrocarbons have an extremely disturbing effect in the concentration range above 10 ppm by volume during the synthesis of the intermediates for the silicon chemistry.

During the synthesis of trichlorosilane from silicon and hydrogen chloride, some of these contaminants are converted into compounds with boiling points close to that of the desired product and can therefore only be separated by distillation with great difficulty. The consequence of this is a rise in the carbon content in the semi-conductor-grade silicon which is obtained from the trichlorosilane to intolerably high values exceeding $3 \times 10^{16}$ carbon atoms per $cm^3$ of silicon which seriously interferes with the semiconductor properties of high purity silicon. Similarly, methyl chloride prepared from methanol and hydrogen chloride, e.g. by a so-called methanolysis from methyl chlorosilanes is contaminated by the impurities introduced by this hydrogen chloride to such a degree that unusable or difficult to separate by-products are obtained in increased quantities during the Rochow synthesis for the preparation of methyl chlorosilanes from silicon and methyl chloride.

To prevent these difficulties, high purity hydrogen chloride is needed for the silicon chemistry which can be prepared, e.g. by burning chlorine in a stream of hydrogen. But this synthetic hydrogen chloride is very expensive. Another possibility for the preparation of high purity hydrogen chloride consists basically of the purification of contaminated hydrogen chloride from a 1,2-dichloroethane pyrolysis by absorption/desorption in azeotropic hydrochloric acid. However, the process is very energy intensive and poses enormous corrosion problems which make it extremely uneconomical. Consequently, hydrogen chloride from the preparation of vinyl chloride could so far be re-used practically only in purely organic chemistry since the organic components are not disturbing there and are often even desirable.

Processes for the removal of unsaturated by-products, e.g. acetylene or ethylene, of a hydrogen chloride stream out of the 1,2-dichloroethane pyrolysis are well-known in the State of Art. For example, DE-OS 23 53 437 describes a hydrogenation process in which the hydrogenation is carried out at flow rates of from 7000 to 15,000 parts by volume of gas per part by volume of catalyst per hour (calculated at 15.6° C. and 1 atmosphere), in at least two consecutive catalyst zones. In that case, the catalyst system has an activity profile that rises in the direction of the product flow.

That process of DE-OS No. 23 53 437 is, however, practicable only when used at relatively low pressures. After only a few months operation, using that catalyst at pressures of 8 bar absolute and above, leads to permanent deactivation of the catalyst as a result of the deposition of carbon black formed by acetylene decomposition. Because of the low practicable pressure level, and the low activity at the beginning of the catalyst zone the catalytic activity of this process is too low to hydrogenate all unsaturated hydrocarbons completely. After passing the catalyst the hydrogen chloride stream contains still 10 pp acetylene and 1500 ppm ethylene.

Not by distillation either, as disclosed for example by U.S. Pat. No. 3,260,059, the content of these unsaturated by-products can be further reduced. Acetylene (−84° C.) and ethylene (−103.7° C.) have a boiling point nearly identical or lower than hydrogen chloride (−84.9° C.). Therefore distillative removal is not possible, but removal has to take place in the hydrogenation step.

OBJECTS OF THE INVENTION

Therefore it is an object of the invention to provide an economical process for the purification of hydrogen chloride from pyrolysis of 1,2-dichloroethane pure enough to be used in silicon chemistry.

It is another object of the invention to design the process for the purification of hydrogen chloride from a 1,2-dichloroethane pyrolysis on the basis of a preceding hydrogenolytic removal of acetylene, to obtain a greater flexibility in the use of the hydrogen chloride produced in large quantities during 1,2-dichloroethane pyrolysis. This means with a preceding step of acetylene hydrogenation to ethylene the hydrogen chloride stream can be re-used in organic chemistry, if the re-use in silicon chemistry is desired the inventive purification process completes the hydrogenation of the unsaturated hydrocarbons in the contaminated hydrogen chloride stream.

THE INVENTION

In the novel process of the invention for the purification of hydrogen chloride from the pyrolysis of 1,2-dichloroethane, optionally after a preceding step of acetylene removal by selective hydrogenation, the improvement comprises (a) hydrogenation of the said contaminated hydrogen chloride in a reactor at a pressure of 5 to 20 bar and a temperature between 10° to 170° C. in the presence of a molar excess of hydrogen of 5:1 to 30:1 based on ethylene present on a catalyst with an aluminum and/or silicon oxide carrier containing 0.05 to 0.2% by weight of palladium with a specific BET surface of 50 to 400 m$^2$/g, the gas mixture flow rate through the adiabatically operated reactor being 0.1 to 0.5 msec$^{-1}$ with a contact time of 3 to 10 seconds calculated with regard to the reactor cross-section and reactor no-load volume under operating conditions, respectively and (b) rectifying the resulting reaction mixture at a pressure of 7 to 15 bar in a column to partially condense hydrogen chloride at the head of the column at −20° to −40° C. and returning it as reflux to the column and maintaining the sump temperature of the column at 50° to 80° C. by vinyl chloride addition or appropriate drain from the column sump so that the hydrogen chloride has (c) a maximum content of the whole of unsaturated hydrocarbons of 5 ppm by volume and a maximum content of the whole of saturated, and unsaturated chlorohydrocarbons of 5 ppm by volume. It is now possible with the process of the invention which opens up the large field of the semi-conductor-grade silicon chemistry and siloxane chemistry for the re-use of hydrogen chloride out of the 1,2-dichloroethane pyrolysis, for the first time on an industrial scale and without large expenditures of energy and technology. It was now found that all contaminants that are particulary disturbing in the silicon chemistry can be removed practically quantitatively by the combination of a catalytic hydrogenation of the contaminated hydrogen chloride obtained from a 1,2-dichloroethane pyrolysis and subsequent rectification of the reaction mixture, as described which eliminates the difficulties described above inherent in the use of this hydrogen chloride in silicon chemistry.

In a preferred embodiment of the process of the invention in a preceding step acetylene is removed from the contaminated hydrogen chloride stream obtained from a 1,2-dichloroethane pyrolysis by hydrogenation to ethylene to have a greater flexibility in the reuse of the hydrogen chloride. In this preceding step using low-surface catalysts, the acetylene is hydrogenated to ethylene with excess hydrogen, at pressures of from 8 to 20 bar absolute and at temperatures of from 120° to 180° C., using platinum or palladium supported catalysts, wherein carrier materials having a specific surface area of not more than 5 m$^2$/g are used. This preceding step of acetylene hydrogenation to ethylene is described in detail in the U.S. Pat. No. 4,388,278.

In a further preferred embodiment of the process of the invention the hydrogenation temperature is 130° to 150° C. and the hydrogen molar excess is 8:1 to 15:1 and the specific BET catalyst surface (DIN 66131) is 100 to 200 m$^2$/g and the gas flow rate is 0.2 to 0.4 msec$^{-1}$ with a contact time of 5 to 7 seconds and the rectification pressure is 9 to 14.5 bar.

The contaminants in hydrogen chloride from a 1,2-dichloroethane pyrolysis that cause interferences in the silicon chemistry can be decreased to values below 1 to 2 ppm (cm$^3$ per m$^3$) for each by the process of the invention. The formed ethane or n-butane remains in the purified hydrogen chloride, but they behave as inert gases during the reactions of hydrogen chloride with silicon or methanol to form trichlorosilane or methyl chloride, respectively, and are thus not interfering components. The hydrogen chloride purified by the invention can be used, e.g., for the preparation of high purity trichlorosilane which can then be converted into semiconductor-grade silicon without carbon problems.

Surprisingly, with the inventive process almost no hydrochlorination of the acetylene to vinyl chloride occurs, despite the high surface of the catalyst, and the high excess of hydrogen chloride in comparison with the unsaturated hydrocarbons. Despite the use of catalyst carrier materials with a relatively large specific surface and the high pressure of up to 20 bar no acetylene decomposition and subsequent coke deposition occurs. A further unexpected and surprising observation is, that resinification or surface agglutination due to polymerizing vinyl chloride which is produced as by-product in smaller amounts during the removal of acetylene by hydrogenation do not occur in the process of the invention, despite the use of catalyst carrier materials with a relatively large specific surface, which results in a very long service life of several years, for example, for the catalyst. The preferred catalyst carrier consists of activated alumina and/or activated silicon dioxide which acquired the desired specific surface by corresponding annealing. Palladium is usually applied as its chloride or oxide to the support. Consequently, the catalyst must be conditioned for several hours in a stream of hydrogen at temperatures of 100° to 150° C. to convert the palladium salt into the metallic form before the subsequent hydrogenation is carried out. The catalyst may be used in conventional forms, e.g. in the form of pellets, spheres, rings or tablets. Preferably, the optimal form is chosen to keep the pressure drop during the flow through the catalyst bed as low as possible.

After the hydrogenation of the unsaturated by-products of the contaminated hydrogen chloride for the subsequent rectification, the hydrogen chloride pressure may have to be increased after passing the hydrogenation reactor by compression to reach the range of the invention and piston, screw or turbo compressors may be used for this purpose. Depending on the concentration of components with higher boiling points which are produced during the hydrogenation step, bottom product must be removed from the sump of the rectifying column to maintain the sump temperature of the rectifying column in the claimed range. The bottom level in the column is kept constant by the addition of the proper amount of vinyl chloride, and the column can be heated e.g. with otherwise practically useless steam with a low pressure such as exhaust steam with a pressure of 1.2 bar gauge. The bottom drain from the rectifying column can be worked up in a seperate vinyl chloride distillation.

Referring now to the drawing:

BRIEF DESCRIPTION OF THE DRAWING

The FIGURE illustrates a preferred practical example of an installation for the performance of the process of the invention.

The installation used in the FIGURE preferably consists basically of a reactor 4 which contains the catalyst for the conversion according to partial step (a) of the process of the invention, and rectifying column 10 for the separation of the contaminants of hydrogen chloride according to partial step (b) of the process of the invention. Reactor 4, which is insulated against heat loss and thus allows a virtually adiabatic course of the reaction, has a feed line 1a for the hydrogen chloride to be purified and hydrogen, and a drain line 5 through which the conversion product is transferred from reactor 4 through heat exchangers 6, 8, and 9 and compressor 7 to rectifying column 10. In addition to line 5, column 10 is provided with head outlet line 13, a return line for head product 20 which is used to adjust the reflux ratio, a feed line 27 which is used in connection with the circulating heating equipment consisting of outlet line 29, reboiler 28 and feed line 30 as well as drain line 31 to maintain the correct sump temperature. Condenser 14, outlet line 21, vessel 18 connected with 14 through line 17 as well as pump 19 which is connected to the head of column 10 by line 20 are used for the separation of the purified hydrogen chloride and for adjusting the reflux ratio.

In the following examples there are described several preferred embodiments to illustrate the invention. However, it should be understood that the invention is not intended to be limited to the specific embodiments.

EXAMPLE 1

The given volumes are recalculated for standard conditions (1.013bar, 0° C.).

Hydrogen chloride from a 1,2-dichloroethane pyrolysis which was separated from its contaminant acetylene by selective hydrogenation but is still contaminated with 4 ppm of acetylene, 2230 ppm of ethylene, 270 ppm of ethane, 110 ppm of vinyl chloride, 12 ppm of ethyl chloride, 8 ppm of unsaturated $C_4$-hydrocarbons such as cis-trans-2-butene, 1-butene and iso-butene and with 0.6 mol % hydrogen was preheated to 130° C. at a rate of 3000 m$^3$/hr at 1 under a pressure of 8 bar (absolute) in heat exchanger 2 operated with steam and fed into hydrogenation reactor 4 from the top through line 1a together with 49 m$^3$/hr of hydrogen from line 3. The molar excess of hydrogen, calculated with respect to the ethylene content in the hydrogen chloride, is approx. 10:1.

The hydrogenation reactor 4 had the following dimensions:

internal diameter 0.92 m and overall height in cylindrical part 1.80 m.

The reactor was packed to a bed height of 1.50 m with hydrogenation catalyst consisting of gamma-aluminum oxide with a specific surface of 120 m$^2$/g and doped with 0.1 wt % of palladium. The catalyst was used in the form of tablets measuring 3 mm×3 mm. In reactor 4, ethylene, vinyl chloride, unsaturated $C_4$-hydrocarbons and optionally acetylene were hydrogenated to form mainly ethane, ethyl chloride and n-butane. The superficial gas velocity calculated with respect to the internal reactor cross-section under reaction conditions is approx. 0.25 msec$^{-1}$ and the contact time was calculated as approx. 6 seconds. Since the reactor was adiabatically operated and the hydrogenation proceeds weakly exothermically, the gas mixture left reactor 4 at a temperature of approx. 140° C. The gas mixture was passed to water cooler 6 by line 5 where it was cooled to 30° C. Then, the gas mixture flew to the suction side of compressor 7 where it was compressed from approx. 7.5 bar (absolute) to 14 bar (absolute). After the compressed gas was cooled to approx. 30° C. in water cooler 8 and further super-cooled by heat exchange with hydrogen chloride gas of approx. −24° C. from the head of the rectifying column 10 in counter-current heat exchanger 9, the gaseous hydrogen chloride flowed through line 5 into column 10, while any produced condensate flowed from water cooler 8 and counter-current heat exchanger 9 through lines 11 and 12 to receiving tank 25.

Vinyl chloride was pumped by pump 23 discontinuously through line 24 into tank 25 and stored temporarily. The liquid stored temporarily in tank 25 which consisted mainly of vinyl chloride was pumped continuously by pump 26 through line 27 at a rate of 20 kg/hr into the bottom of column 10 to keep the bottom level constant, since bottom product is drained at a rate of approx. 20 kg/hr through lines 29 and 31 to maintain a bottom temperature of approx. 75° C. which was then cooled in water cooler 32 and removed at 33 for working up in a seperate distillation that is not shown. Column 10 was heated with steam at 1.2 bar gauge pressure, and the bottom product circulated through lines 29 and 30 and reboiler 28. Gaseous hydrogen chloride was collected at the head of column 10 and was fed by line 13 into condenser 14 filled with a coolant, e.g. Frigen®, a fluorochlorohydrocarbon compound. The liquid coolant was added to condenser 14 by line 15 and the warmed or evaporized coolant flowed back by line 16 to the refrigerating machine (not shown). Partial condensation took place in condenser 14 at −24° C. and 13.5 bar abs. pressure at the column head, the liquified hydrogen chloride was collected at a rate of approx. 2000 kg/hr. The liquified hydrogen chloride flowed through line 17 into receiver 18 and was added to column 10 as liquid reflux by pump 19 through line 20. The purified hydrogen chloride left the purification installation through line 21 and counter-current heat-exchanger 9 and was discharged at 22 with the following purity to the silicon plants:

Acetylene < 1 ppm (by volume)
Ethylene < 2 ppm (by volume)
Vinyl chloride < 2 ppm (by volume)
Ethyl chloride < 1 ppm (by volume)
Ethane approx. 2.800 ppm (by volume)
n-Butane approx. 10 ppm (by volume)

The bottom product from rectifying column 10 contains approx. 5 wt % of ethyl chloride, approx. 1.5 wt % of 1,1-dichloroethane produced by hydrochlorination of vinyl chloride in the column and 93.5 wt % of vinyl chloride.

EXAMPLE 2

Example 1 has been repeated with the same apparatus, the same catalyst, and under the same conditions as described—but without a preceding step of acetylene hydrogenation.

3000 m$^3$/hr hydrogen chloride from a 1,2-dichloroethane pyrolysis plant which was contaminated with 2557 ppm (by volume) of acetylene, 80 ppm of ethylene, 5 ppm of vinyl chloride and 0.5 ppm of ethyl chloride were preheated to 130° C. and fed to the hydrogenation reactor together with 153 m$^3$/hr hydrogen. The molar excess of hydrogen, calculated with respect to the acetylene content in the hydrogen chloride was approximately 10:1. In the reactor acetylene, ethylene and vinyl chloride were hydrogenated to form mainly ethane, ethyl chloride and some n-butane from an acetylene dimerization route. Due to the higher reaction enthalpy of acetylene hydrogenation the gas mixture left the adiabatically operated reactor at a temperature of approximately 145° C. The gas mixture had the following composition:

Acetylene < 1 ppm (by volume)
Ethylene < 2 ppm (by volume)
Vinyl chloride = 150 ppm (by volume)
Ethylchloride = 20 ppm (by volume)
Ethane approx. 2650 ppm (by volume)

n-Butane approx. 12 ppm (by volume)

After cooling and compression the gas mixture was purified in the column and left the distillation unit with the following purity to the silicon plants:

Acetylene <1 ppm (by volume)
Ethylene <2 ppm (by volume)
Vinyl chloride <2 ppm (by volume)
Ethylchloride <1 ppm (by volume)
Ethane approx. 2650 ppm (by volume)
n-Butane approx. 12 ppm (by volume)

Various modifications of the process of the invention may be made without departing from the spirit or scope thereof and it should be understood that the invention is intended to be limited only as defined in the appended claim.

What we claim is:

1. In a process for the purification of hydrogen chloride from the pyrolysis of 1,2-dichloroethane, the improvement consisting essentially of (a) hydrogenation of the said contaminated hydrogen chloride in a reactor at a pressure of 5 to 20 bar and a temperature between 10° to 170° C. in the presence of a molar excess of hydrogen of 5:1 to 30:1 based on ethylene present on a catalyst with an aluminum and/or silicon oxide carrier containing 0.05 to 0.2 % by weight of palladium with a specific BET surface of 50 to 400 m$^2$/g, the gas mixture flow rate through the adiabatically operated reactor being 0.1 to 0.5 msec$^{-1}$ with a contact time of 3 to 10 seconds calculated with regard to the reactor cross-section and reactor no-load volume under operating conditions, respectively and (b) rectifying the resulting reaction mixture at a pressure of 7 to 15 bar in a column to partially condense hydrogen chloride at the head of the column at $-20°$ to $-40°$ C. and returning it as reflux to the column and maintaining the sump temperature of the column at 50° to 80° C. by vinyl chloride addition or appropriate drain from the column sump so that the hydrogen chloride has (c) a maximum content of the whole of unsaturated hydrocarbons of 5 ppm by volume and a maximum content of the whole of saturated, and unsaturated chlorohydrocarbons of 5 ppm by volume.

2. The process of claim 1 wherein the hydrogenation is affected at 130° to 150° C. with a hydrogen molar excess of 8:1 to 15:1.

3. The process of claim 1 wherein the specific BET surface is 100 to 200 m$^2$/g.

4. The process of claim 1 wherein the gas flow rate is 0.2 to 0.4 msec$^{-1}$ and the contact time is 5 to 7 seconds.

5. The process of claim 1 wherein the rectification pressure is 9 to 14.5 bar.

* * * * *